W. W. WILLS.
FERTILIZER DISTRIBUTING ATTACHMENT.
APPLICATION FILED FEB. 19, 1918.

1,293,281.

Patented Feb. 4, 1919.
2 SHEETS—SHEET 1.

WITNESSES

INVENTOR
William W. Wills,

BY

ATTORNEY

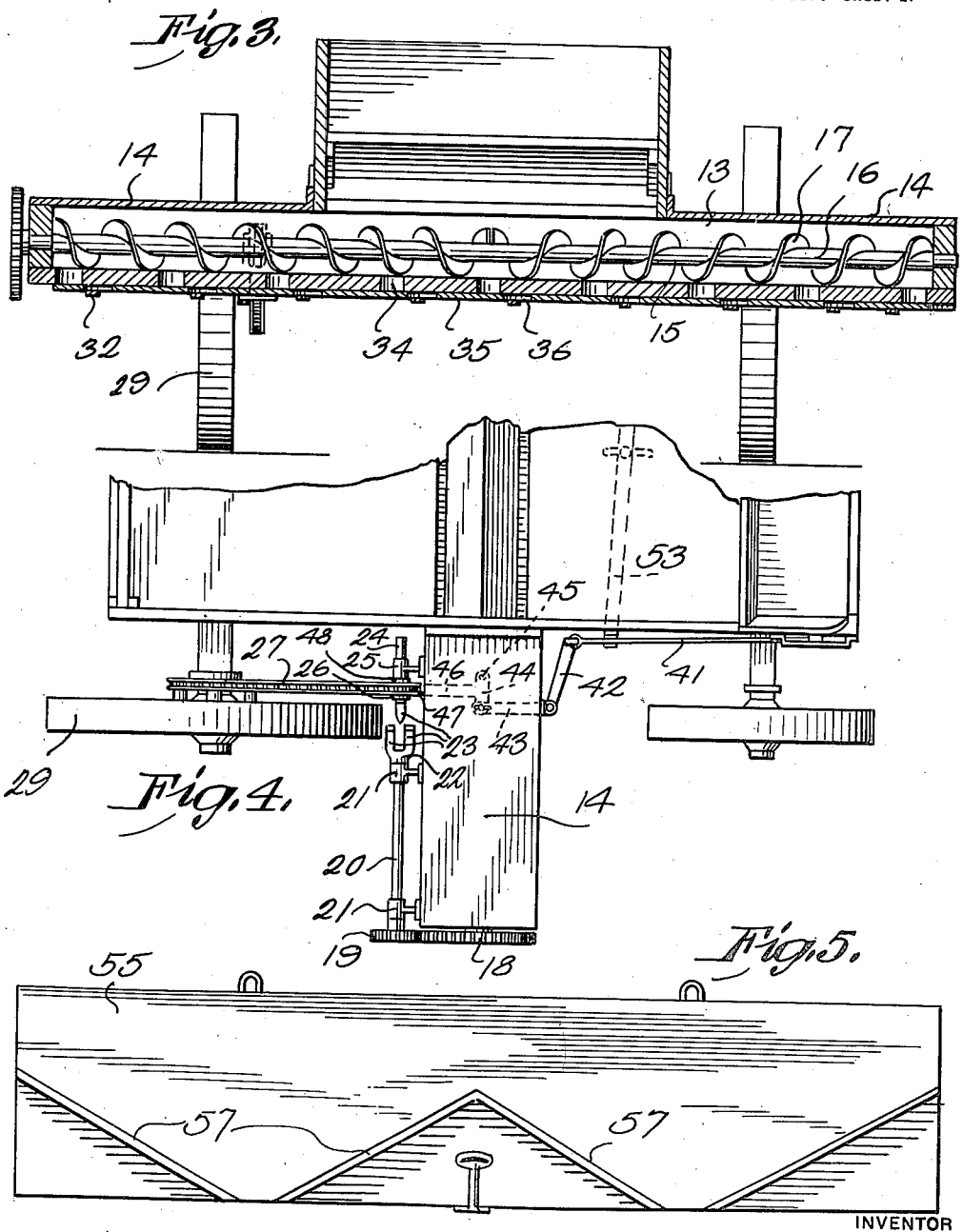

UNITED STATES PATENT OFFICE.

WILLIAM W. WILLS, OF PALMYRA, VIRGINIA.

FERTILIZER-DISTRIBUTING ATTACHMENT.

1,293,281.   Specification of Letters Patent.   Patented Feb. 4, 1919.

Application filed February 19, 1918. Serial No. 218,129.

*To all whom it may concern:*

Be it known that I, WILLIAM W. WILLS, a citizen of the United States, residing at Palmyra, in the county of Fluvanna and State of Virginia, have invented certain new and useful Improvements in Fertilizer-Distributing Attachments, of which the following is a specification.

This invention has relation to improvements in fertilizer distributers, and has for an object to provide an attachment designed to be embodied in a wagon body of, conventional type having connection with the running gear to effectively spread fertilizer over a field during travel of the vehicle.

Another object of the invention is to provide an attachment adapted to be secured beneath a wagon body and to extend beyond the side thereof and embodying a distributer and agitator element whereby the fertilizer may be conveyed from the wagon uniformly to all parts of the attachment and subsequently distributed broadcast therefrom so as to cover a wide track of the field at each trip of the vehicle thereacross.

Another object of the invention is to provide a fertilizer distributer attachment of the character above described embodying means for regulating the flow of material from the wagon into the distributer attachment, and for distribution of material from the distributer so that the quantity of fertilizer to be distributed per unit area of field may be accurately regulated.

A still further object is to provide a fertilizer distributer attachment for wagon bodies embodying an operating connection with the running gear and a clutch of a novel type interposed in said connection with a lever operated means under the control of the driver to engage or disengage the clutch and to automatically initiate or discontinue operation of the broadcast distributer, and an agitating means in the distributer operable by moton of the running gears.

A still further object of the invention is to provide a fertilizer distributer attachment for wagon bodies which may be attached thereto by unskilled labor or persons not possessing skill in mechanics or mechanical adjustments, and to that end embodies a sprocket of a novel type adapted to embrace the hub of the wagon wheel of the running gear and embodies spokes of a novel and adjustable character which may be readily adjusted by an unskilled mechanic with the assurance that the sprocket will be absolutely concentric to the center of the wagon wheel when adjusted in the manner directed.

A still further object of the invention is to provide means forming an attachment to the fertilizer distributer so as to direct the fertilizer into adjacent furrows without in any way altering the nature or construction of the machine.

In addition to the foregoing my invention comprehends improvements in the details of construction and arrangement of the correlative parts to be hereinafter more fully described and particularly set forth in the appended claims.

In the accompanying drawings in which similar and corresponding parts are designated by the same characters of reference throughout the several views in which they appear:

Fig. 3, is a transverse section taken on the line 3—3 of the immediate preceding figure.

Fig. 4, is a fragmentary view in plan illustrating one side of the vehicle and a portion of the distributer.

Fig. 5, is a view in plan of the attachment for converting the distributer into a furrow filling machine.

The present invention is an improvement over the copending application filed November 27th, 1916, and bearing Serial #133,739, which application discloses a device of the same general nature and in a similar manner includes a wagon body 10 provided in its bottom wall intermediate its length with a transversely extending opening 11 extending from side to side of the wagon.

Figure 1:
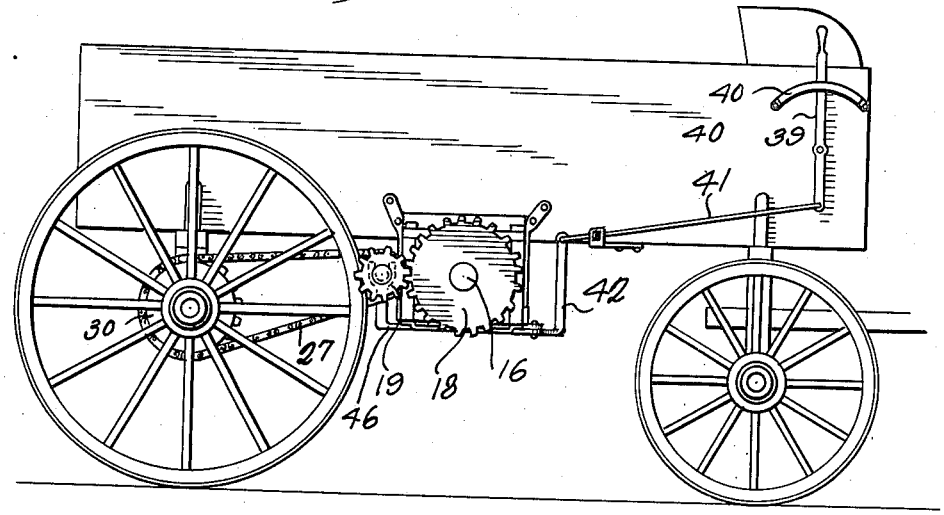
Figure 1, is a view in side elevation of a farm wagon of conventional type illustrating the embodiment therein of my improved fertilizer distributer attachment.
Figure 2:
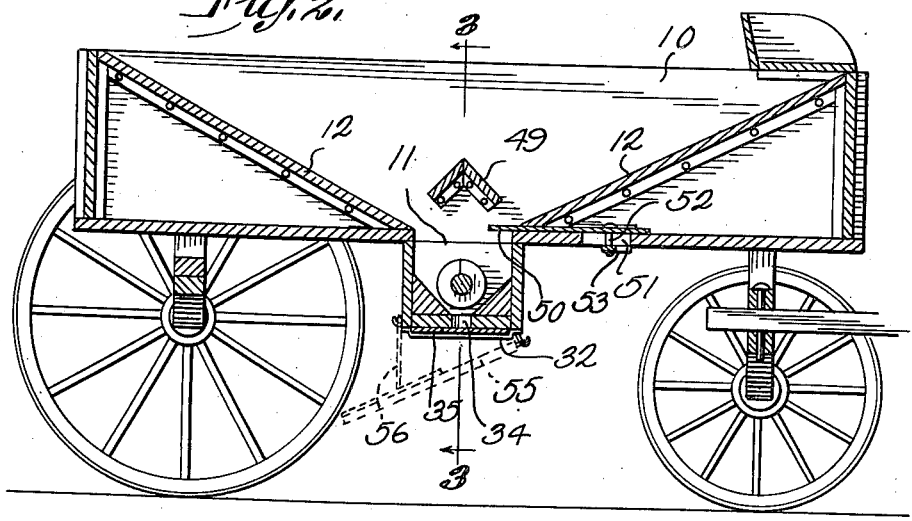
Fig. 2, is a view in longitudinal section taken through the vehicle body and attachment.

Runways 12 are provided within the wagon body extending from the top edges of opposite ends in downwardly converging relation toward the longitudinal edges of the opening 11 to provide in effect a gondola shaped wagon body whereby to direct all the material toward the center of the wagon. The attachment includes a trough distributing box 13, rectangular in cross section having its top side covered as at 14 for a portion of its length from the ends of the device toward the center, the adjacent ends of said top plate 14 being spaced to a distance corresponding to the width of the wagon body whereby the device may be secured to the under side of the body as indicated in Fig. 3. It will be noted that the device 13 which may be called the mixing and distributing chamber extends beyond the sides of the wagon so as to distribute material over a relatively wide track. Mounted within the mixing chamber 13 is a combined agitator and conveyer indicated at 15 in the form of a shaft 16 journaled at its ends in the end walls of the mixing chamber and having a pair of spiral ribs 17 extending thereabout in opposite directions from the ends of the shaft toward the center so that rotation of the shaft in one direction may cause the material to be distributed from the center of the mixing chamber uniformly toward both ends. One end of the shaft 16 extends beyond the end of the mixing chamber to receive a relatively large spur gear 18 which is in meshing engagement with a pinion 19 smaller in size mounted on one end of the shaft 20. The shaft 20 is journaled in bearings 21 secured to the side of the mixing chamber 13 and extends horizontally and in parallel relation thereto toward the wagon body. The inner end of the shaft 20 is provided with one member of a clutch indicated at 22 comprising a pair of spaced parallel fingers 23. Mounted on the side of the mixing chamber and in alinement with a shaft 20 is a second shaft 24 mounted in bearings 25 and the outer end of said shaft 20 is provided with a clutch member similar to the clutch member 22 and likewise comprising spaced parallel fingers 23 for interdigital relation with the member 22. Slidably mounted on the shaft 24 is a sprocket wheel 26 upon the outer end of which is mounted the clutch member comprising the members 23 just described. An endless chain 27 is passed around the sprocket wheel 26 and also around a relatively large sprocket wheel 28 which is secured to one of the wagon wheels 29. This sprocket wheel 28 is of a specific construction and comprises an annular rim 30 having a plurality of inwardly extending radial spokes 31 having their inner ends in spaced relation. One side face of each spoke 31 is serrated and formed with an aperture to receive a bolt 32. Applied to each spoke 31 is an extension bar 33 having its face designed for contact with the face of the spoke 31 serrated in a similar manner and slotted longitudinally to permit the bolt 32 to pass therethrough. The extension bars 33 are movable radially toward and away from the center of the rib 30 and may be secured in any adjusted position by tightening the bolts 32. The bottom wall of the mixing chamber 13 is formed with a plurality of longitudinally spaced openings 34, and a plate 35 is applied to the under side of the mixing chamber exteriorly to cover said openings and to extend from end to end of the mixing chamber. The plate 35 is likewise provided with a plurality of openings 36 designed for registration with the openings 34 and the plate is guided for longitudinal movement in suitable brackets 37. Mounted upon one side of the wagon body adjacent the driver's seat is a lever 39 having its upper end guided within an arcuate guide member 40 and having its lower end pivotally connected to a link 41 extending rearwardly. The rear end of the link 41 is connected to one arm 42 of a bell crank fulcrumed upon the side of the mixing chamber 13 at a point adjacent the under side thereof while the other arm 43 extends transversely across the under side of the mixing chamber and is pivotally connected to the outer end of a link 44 which extends in a direction longitudinally of the mixing chamber and has its other end pivotally connected as at 45 to the apertured plate 35. It will be obvious that by oscillating the lever 39 the bell crank may be rocked and through the medium of the link 44 slide the plate 35 to vary the aperture of the opening 34 of the mixing chamber. Formed integrally with the link 44 and extending laterally therefrom is an arm 46 which is bifurcated at its outer end as at 47 to engage in a groove 48 formed upon an enlargement of the pinion 26 described above. It will be seen that when the plate 35 is shifted longitudinally to vary the aperture of the opening 34 as stated above, the sprocket wheel 26 will be likewise shifted and the clutch member 22 brought into engagement or moved out of engagement as the case may be. Disposed above the opening 11 within the wagon body is a deflector member comprising downwardly diverging plates 49 having their lower edges spaced from the ends of the runways 12 to permit the material to pass therebetween. Mounted upon the bottom board of the wagon body adjacent one longitudinal edge of the opening 11 is a plate 50 slidable longitudinally of the wagon and interposed between the upper surface of the bottom plate of the wagon body and the lower edge of the forward runway 12 as shown in Fig. 2. A slot 51 is formed in the bottom of the wagon body and a bolt 52 extends therethrough, passing through the plate 50 for connection thereto, the lower end of the bolt being secured in a transversely extending lever 53 which is fulcrumed at one side of the wagon and has its other side extended beyond the side of the wagon body and connected to the link 41.

Figure 6:
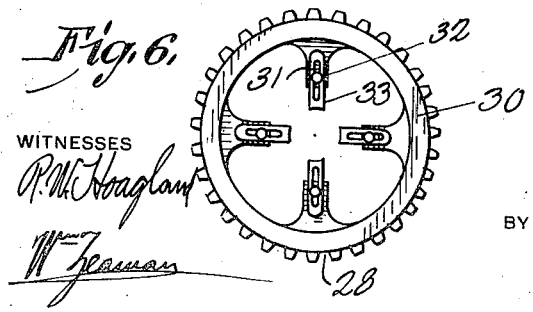
Fig. 6, is a view in plan of my improved sprocket wheel.

In operation, during forward travel of the vehicle, the motion of the wagon wheel 29 is transmitted through the chain and sprocket connection disclosed to the spiral conveyer within the mixing chamber. Material is fed by gravity from the wagon body through the opening 11 into the mixing chamber and is conveyed by the spiral conveyer toward both ends of the mixing chamber uniformly. The lever 39 is adjusted relative to graduations on the guide plate 40 according to the quantity of fertilizer to be spread over a unit area of field. It will be noted that by adjusting the lever 39 both the plate 50 and plate 35 will be moved simultaneously, the plate 50 acting to control the flow material from the wagon to the mixing chamber, and the plate 35 acting to control the flow of material from the mixing chamber through the openings 34. Two controlling means are thus provided acting conjunctively to regulate the quantity of material distributed. It will be further noted that the operator is enabled to uncover the openings 34, regulate the extent of the aperture thereof and simultaneously throw the clutch member 22 into engagement to initiate actuation of the conveyer. It will be noted that the clutch members having once become engaged may move relatively while in engagement to permit the plates 35 and 50 to be adjusted to any extent whatsoever. In applying this attachment to a vehicle body it will be seen that very few operations are required the mixing chamber being suspended from the wagon body by any suitable means and which may be readily done by an unskilled laborer. It will be furthermore noted that owing to the provision of the specific form of sprocket shown in Fig. 6, the sprocket wheel may be readily applied to a vehicle wheel with assurance that the sprocket wheel will be concentric relative to the center of the wagon wheel. To apply the sprocket wheel it is but necessary to adjust the extension bars 33 to the same extent toward the center to approximately engage the hub of the wagon wheel. If after the first trial the inner ends of the extension bars do not engage the hub they are each adjusted or moved toward the center of the sprocket to the same extent and the sprocket again applied, this process being continued until the inner ends of the extension bars engage the hub. The sprocket wheel is then secured to the spokes of the wheel by U-bolts which embrace the spokes of the wagon wheel and also the spokes 31 of the sprockets.

In order that this fertilizer distributer attachment may be utilized to drop fertilizer in furrows instead of spreading it broadcast, I provide an attachment which consists of a board or plank shown in Fig. 5, and indicated at 55. The plank is secured in one longitudinal edge to the forward longitudinal edge of the mixing chamber 13 so as to depend therefrom at an angle and to extend rearwardly as shown in dotted lines in Fig. 2 of the drawings. Links 56 may be utilized to support the rear edge of the plank at the desired angle. Secured to the upper surface of the planks are a plurality of ribs 57 which extend rearwardly in converging relation with rear adjacent ends of the ribs in spaced relation to form discharge apertures and said apertures being spaced to a distance corresponding to the width of the furrows to be filled. In use, the material as it falls from the mixing chamber is collected by the ribs 57 as the material flows downward by gravity and is directed toward the adjacent ends of the ribs 57 and ultimately falls from the device into the furrows.

While I have illustrated and described my invention with some degree of particularity, I realize that in practice various alterations thereover may be made and I therefore desire to reserve the right and privilege of changing the form of the details of construction and arrangement of the correlative parts without departing from the spirit of the invention or the scope of the appended claims.

Having thus described my invention what I claim as new and desire to secure by Letters Patent is:—

1. A fertilizer distributer including a mixing chamber having discharge openings therein, a baffle arranged in the path of the discharge openings and equipped with means extending laterally from one margin for pivotal connection with co-acting means on said chamber, supports depending from said mixing chamber and engaged with said baffle to hold the latter inclined, and ribs formed on the baffle, having their inception at the longitudinal center of the latter, said ribs converging toward and terminating at the free margin of the baffle.

2. In combination with a wagon body having an opening in its bottom wall, of a fertilizer distributer attachment including a mixing chamber adapted to be secured to the wagon body in registration with the opening therein, said mixing chamber having a plurality of distributing apertures, and means operable simultaneously for regulating the flow of material from the wagon body to the mixing chamber and from the mixing chamber through the apertures.

3. In combination with a wagon body having an opening in its bottom wall, and downwardly inclined runways leading to said opening, of a fertilizer distributer attachment including a mixing chamber adapted to be secured to the wagon body and in registration with the opening therein, a deflector plate mounted over the opening to deflect material toward the mixing chamber, a plate slidable in the wagon body to control the flow of material from the wagon body at one side of the deflector to the mixing chamber, means for controlling the flow of material from the mixing chamber and means for operating said plate and said last mentioned means simultaneously.

4. In combination with a wagon body having an opening in its bottom wall, of a fertilizer distributer attachment including a mixing chamber adapted to be secured to the wagon body in registration with the opening, a slidable plate for regulating the flow of material from the wagon body to the mixing chamber, said mixing chamber having a plurality of distributing apertures, a slidable plate apertured for controlling the flow of material from the mixing chamber, a bell crank, a link connecting one arm of the bell crank to the last mentioned plate, a lever, a connection between said lever and the first mentioned plate, and means for operating said lever and bell crank simultaneously whereby to adjust the plates in unison.

5. In combination with a wagon body and running gear, a fertilizer distributer attachment including a mixing chamber, a plate slidably mounted to vary the extent of the apertures, a rotatable agitator and conveyer element within the mixing chamber, a shaft for operating said agitator and conveyer, a clutch member on said shaft comprising a pair of spaced fingers, a second shaft in alinement with the first, a slidable sprocket on said second shaft, a clutch member movable with said sprocket including a pair of spaced fingers adapted for interdigital relation with the fingers of the first clutch member, means for driving said sprocket from the running gear, and means for moving the plate and sprocket simultaneously to engage or disengage the clutch and to vary the extent of the distributing aperture of the mixing chamber.

In testimony whereof I affix my signature in presence of two witnesses.

WILLIAM W. WILLS.

Witnesses:
M. E. JONES,
B. F. GARVEY.